United States Patent Office 2,996,518
Patented Aug. 15, 1961

2,996,518
5,7,9-TRIOXASPIRO[3.5] NONANES
David C. England, Wilmington, Del., assignor to E. I. du Pont de Nemours and Company, Wilmington, Del., a corporation of Delaware
No Drawing. Filed Nov. 18, 1958, Ser. No. 774,595
17 Claims. (Cl. 260—340.7)

This invention relates to a new class of cyclic ethers, more particularly to a new class of spiropolyfluorotrioxanes, and has as its principal objects provision of these new compounds and of syntheses therefor.

Cyclic ethers as a class are well recognized as useful reactants and as solvents and plasticizers. Generally such ethers have been limited in their usefulness because of relatively low physical and chemical stability. Recently—see U.S. Patent 2,594,272—the perfluoromonocyclic ethers of from three to five ring carbons have been prepared and have been found to exhibit a high degree of chemical inertness. While these ethers are of interest because of this stability, they are of only limited usefulness in view of their undesirably low boiling points. Thus, the four-membered ring perfluorooxetane is normally a gas boiling at about −38° C. The five-membered ring compound, perfluorooxolane, is likewise a gas, having a normal boiling point of about 1° C. Finally, even the six-membered ring perfluorinated cyclic ether, i.e., perfluorooxane, is a volatile liquid having a normal boiling point of about 32° C.

There has now been discovered a new class of chemically and physically stable, high boiling, cyclic ethers. More specifically, there has now been discovered a new class of polyfluorosubstituted-1,3,5-trioxanes in which at least one ring carbon thereof is a spiro ring carbon, i.e., forms a part of another ring or rings in addition to the 1,3,5-trioxane ring. These other rings are tetrafluoroperhalocyclobutane rings. Any additional substituents, if any, on the 1,3,5-trioxane ring are monovalent substituents free of aliphatic unsaturation and of no more than eight carbons each.

Stated alternatively, these new polycyclic polyfluorosubstituted spiro compounds can be described as 2,2-mono- and 2,2-,4,4-bis(α,α-dihalo-β,β,γ,γ-tetra-fluorotrimethylene)-1,3,5-trioxanes in which any other substituents on the 4- and/or 6-ring carbons of the 1,3,5-trioxane ring are monovalent aliphatically saturated radicals, of no more than eight carbons apiece and expressly inclusive of monovalent alkyl, aryl, aralkyl, alkaryl, and cycloalkyl radicals. The two halogens on the α-carbon of the tetrafluorotrimethylene diradicals, i.e., in the 2-position of the dihalotetrafluorocyclobutane rings, are of atomic number from 9 to 35, inclusive, alike or different, i.e., fluorine, chlorine, or bromine. Because of readier availability of the intermediates and generally easier preparation, the preferred compounds are those wherein the halogens in the said α-position are fluorine or chlorine, particularly the former and the said substituents are wholly hydrocarbon.

These new polyfluorospirotrioxanes thus have one of the following two structures:

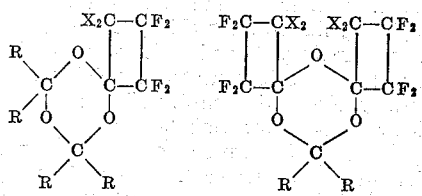

wherein the R's, which can be alike or different, are used to represent hydrogen or monovalent aliphatic, aromatic, alkaromatic, araliphatic, and cycloaliphatic radicals of no more than eight carbons each, free of aliphatic unsaturation, i.e., aliphatically saturated, and free of Zerewitinoff active hydrogen and the X's, which also can be alike or different, are used to indicate halogen atoms of atomic number from 9 to 35, inclusive, i.e., fluorine chlorine, or bromine. The wholly aliphatic R substituents can contain no more than five carbons each. No more than one R on each trioxane ring carbon can be linked to said carbon through aromatic carbon in which case the said ring carbon must also carry hydrogen. The preferred compounds are those wherein the halogen is of atomic number from 9 to 17, inclusive, i.e., fluorine or chlorine, and most preferably fluorine alone and wherein the R's are wholly hydrocarbon.

These products can be named in several ways. Thus, to stress the parent trioxane structure as the major similarity between the mono- and dispiro compounds, they can be called, as above, mono- and bis-(α,α-dihalo-β, β,γ,γ-tetrafluorotrimethylene)-substituted-1,3,5-trioxanes. The monospiro compounds would be named and indexed by Chemical Abstracts and also by the IUPAC—see, for instance, rule A–41 of the tentative rules for organic nomenclature reported on at Zurich, July 20–28, 1955— as suitably substituted trioxaspiro[3.5]nonanes, i.e., as 1,1-dihalo - 2,2,3,3 - tetrafluoro-5,7,9 - trioxaspiro[3.5] nonanes. The dispiro compounds, it is believed, are most unequivocally named in accordance with section .7 of the aforesaid rule A–41 using the prime and double prime nomenclature with respect to the second and third rings. Thus, the dispiro compounds would be properly described as 2,2-dihalo-3,3,4,4-tetrafluorocyclobutane - 1-spiro-2′-1′, 3′,5′-trioxane - 6′-spiro-1″-2″,2″-dihalo-3″,3″,4″,4″-tetrafluorocyclobutanes.

These new polyfluoromono- and dispiro-1,3,5-trioxanes can be prepared readily by the direct cyclo-addition of, respectively, one and two molar proportions of the requisite 2,2-dihalo-3,3,4,4-tetrafluorocyclobutanone and, respectively, two and one molar proportions of the requisite aldehyde or ketone. Depending on the stoichiometry and the relative reactivity of the carbonyl reactants, mixtures of products will be obtained. The reaction involves cycloaddition across the carbonyl double bonds of the 2,2-dihalo-3,3,4,4-tetrafluorocyclobutanone and the respective monocarboxaldehydes and ketones. Reaction temperatures for the cycloaddition reaction will vary widely, depending on the relative reactivity of the α,α-dihalo-3,3,4,4-tetrafluorocyclobutanone and the particular oxocarbonyl compound, i.e., aldehyde or ketone, being used, and will generally lie in the range from appreciably below room temperature for the more reactive compounds to elevated temperatures up to about 250° C. or so, generally under sealed reaction conditions and autogenous pressure. The most reactive compounds will generally be perfluorocyclobutanone and the oxocarbonyl compound with the shorter carbon chains, with many of which the reaction can be carried out at atmospheric pressure.

If a carboxaldehyde is used, the monospiro products will have as substituents on the 4- and 6-carbons of the 1,3,5-trioxane ring the radical of the carboxaldehyde which, with the formyl group, forms the entire carboxaldehyde molecule. If a ketone is used, the monospiro products will have as substituents pairwise on each of the 4- and 6-carbons of the 1,3,5-trioxane ring the two radicals which together with the ketone carbonyl group form the entire ketone molecule. In the case of the dispiro products of both types, the same respective substituents will be present only on the 6-carbon of the 1,3,5-trioxane ring. In all instances, the substituents on the 2-carbon of the 1,3,5-trioxane ring in the case of the monospiro products and on the 2- and 4-carbons of the 1,3,5-trioxane ring in the case of the dispiro products will be the α,α-dihalo-β,β,γ,γ-tetrafluorotrimethylene diradical, which together with the ring carbonyl forms the entire molecule of the 2,2-dihalo-3,3,4,4-tetrafluorocyclobutanone reactant.

The new polyfluorospiro-1,3,5-trioxanes of this invention and the preparation thereof are illustrated in greater detail but are not to be limited by the following more specific examples in which the parts given are by weight.

*Example I*

A thick-walled, glass reactor approximately 24 diameters long and of internal capacity corresponding to about 150 parts of water was evacuated, cooled in a liquid nitrogen bath, and charged with four parts of n-butyraldehyde and six parts (1.6 molar proportions based on the aldehyde) of perfluorocyclobutanone. The reactor was then sealed and allowed to warm to room temperature. An apparently polymeric white solid was formed. On shaking, an exothermic reaction occurred and the solid disappeared.

The reaction mixture was warmed on the steam bath for one hour and the reactor was cooled in a liquid nitrogen bath and then opened. Upon distillation of the reaction mixture there was obtained a small quantity of recovered perfluorocyclobutanone and 5.5 parts (31% of theory) of 1,1,2,2,3,3-hexafluoro - 6,8 - di-n-propyl-5,7,9-trioxaspiro-[3.5]nonane, i.e., 2,4-di-n-propyl-1,3,5-trioxane-6-spiro-1'-2',3',3',4',4'-hexafluorocyclobutane, as a clear, colorless liquid boiling at 73° C. at a pressure corresponding to 10 mm. of mercury. The product can also be named as 2,2-(α,γ-hexafluorotrimethylene)-4,6-di-n-propyl-1,3,5-trioxane. The nuclear magnetic resonance and infrared spectra were consistent with the hexafluoro-di-n-propyltrioxaspirononane structure.

*Analysis.*—Calcd. for $C_{12}H_{16}O_3F_6$: C, 44.8%; H, 5.0%; F, 35.4%. Found: C, 45.2%; H, 5.2%; F, 35.1%.

*Example II*

A glass reactor was charged as in Example I with eight parts of benzaldehyde and nine parts (0.67 molar proportion based on the aldehyde) of perfluorocyclobutanone and then sealed. At room temperature two phases were present, but after slight warming on the steam bath an amber-colored, single-phase reaction mixture was formed. After heating overnight at steam bath temperature, the reaction mixture had become blue-green. The reactor was then cooled in a liquid nitrogen bath and opened; on exposure to air the charge turned amber.

Distillation of the reaction mixture afforded 7.9 parts (68% of theory) of crude 2,2-,4,4-bis-(α,γ-hexafluorotrimethylene)-6-phenyl-1,3,5-trioxane contaminated with a small portion of benzoic acid. The crude product was washed with dilute aqueous sodium hydroxide, and upon redistillation there was obtained seven parts of pure 6-phenyl-2,2-,4,4 - bis(α,γ-hexafluorotrimethylene) - 1,3,5-trioxane, i.e., 2,2,3,3,4,4-hexafluorocyclobutane-1-spiro-2'-4'-phenyl-1',3',5'-trioxane-6'-spiro-1'',2'',2'',3'',3'',4'',4''-hexafluorocyclobutane as a clear, colorless liquid boiling at 69° C. under a pressure corresponding to 2 mm. of mercury; $n_D^{25}$, 1.3960. Nuclear magnetic resonance and infrared spectra were consistent with the dodecafluorophenyltrioxadispirododecane structure.

*Analysis.*—Calcd. for $C_{15}H_6F_{12}O_3$: C, 39.0%; H, 1.3%; F, 49.3%. Found: C, 39.2%; H, 1.5%; F, 49.3%.

*Example III*

A glass reactor as in Example I was cooled and charged with 16 parts of perfluorocyclobutanone and 2.6 parts (0.5 molar proportion based on the fluoroketone) of acetone. The reactor was sealed and heated on a steam bath for 15 hours. The reactor was then cooled, opened, and the crude reaction mixture fractionated by distillation. There was thus obtained 2.5 parts (13.4% of theory) of 6,6 - dimethyl - 2,2,4,4 - bis(α,γ-hexafluorotrimethylene)-1,3,5-trioxane, i.e., 2,2,3,3,4,4-hexafluorocyclobutane - 1 - spiro-2'-4',4'-dimethyl-1',3',5'-trioxane-6'-spiro-1'',2'',2'',3'',3'',4'',4''-hexafluorocyclobutane, as a clear, colorless liquid boiling at 34° C. at a pressure corresponding to 4 mm. of mercury; $n_D^{25}$, 1.3402. The nuclear magnetic resonance spectrum was consistent with the dodecafluorodimethyltrioxadispirododecane structure.

*Analysis.*—Calcd. for $C_{11}H_6O_3F_{12}$: C, 31.9%; H, 1.5%; F, 55.0%. Found: C, 32.4%; H, 1.9%; F, 55.0%.

*Example IV*

A glass reactor was charged as in Example I with ten parts of dry, solid polyformaldehyde (Alkaform) and 48 parts (0.81 molar proportion based on the aldehyde) of perfluorocyclobutanone and then sealed. Another similar reactor was charged in a like manner with ten parts of dry, solid polyformaldehyde and 44 parts (about 0.74 molar proportion based on the aldehyde) of perfluorocyclobutanone and then sealed. Both reactors were heated to 175° C. and held at this temperature for a period of 12 hours, during which the polyformaldehyde thermally depolymerized to formaldehyde and underwent a cycloaddition reaction with the perfluorocyclobutanone. The reactors were then cooled and opened. The reaction mixtures were combined and the product isolated by distillation.

There was thus obtained 24 parts of recovered perfluorocyclobutanone and 65 parts (71.5% of theory based on unrecovered ketone) of 2,2-(α,γ-hexafluorotrimethylene)-1,3,5-trioxane as a clear, colorless liquid boiling at 76° C. at a pressure corresponding to 100 mm. of mercury. On cooling the 1,1,2,2,3,3-hexafluoro-5,7,9-trioxaspiro[3.5]nonane solidified, melting point 36–38° C.

*Analysis.*—Calcd. for $C_6H_4F_6O_3$: C, 30.3%; H, 1.7%; F, 47.9%. Found: C, 30.4%; H, 1.8%; F, 48.4%.

*Example V*

A glass reactor was charged as in Example I with 27 parts of perfluorocyclobutanone and 6.7 parts (equimolar on the ketone) of acetaldehyde and then sealed. On removing from the liquid nitrogen bath and while being warmed to room temperature, the charge exhibited the appearance of a polymeric solid. However, on shaking the reactor at room temperature the charge rapidly and exothermically was converted to a homogeneous liquid. The reactor was let stand overnight at room temperature and the tube then cooled and opened. The product was isolated from the reaction mixture by distillation. There was thus obtained 11 parts of recovered perfluorocyclobutanone and 18 parts (75% of theory based on unrecovered ketone) of 2,2-(α,γ-hexafluorotrimethylene)-4,6-dimethyl-1,3,5-trioxane, i.e., 1,1,2,2,3,3-hexafluoro-6,8-dimethyl-5,7,9-trioxaspiro[3.5]nonane, as a clear, colorless liquid boiling at 135° C. at atmospheric pressure.

*Analysis.*—Calcd. for $C_8H_8F_6O_3$: C, 36.1%; H, 3.0%; F, 42.9%. Found: C, 36.4%; H, 3.2%; F, 43.3%.

*Example VI*

A glass reactor as in Example I was charged with a mixture of 4.5 parts of dry solid polyformaldehyde (Alkaform) and 31.7 parts (an equimolar proportion based on the aldehyde) of 2,2 - dichloro - 3,3,4,4 - tetrafluorocyclobutanone and then sealed. The sealed reactor was heated at 130° C. for 12 hours, during which time, as in Example IV, the polyformaldehyde thermally depolymerized to formaldehyde and underwent a cycloaddition reaction with the dichlorotetrafluorocyclobutanone. The reactor was cooled and opened. Sixteen parts of unreacted dichlorotetrafluorocyclobutanone was recovered by distillation under reduced pressure. From the residue by distillation there was obtained 15.1 parts (74% of theory) of 2,2-(α,α-dichloro-β,β,γ,γ-tetrafluorotrimethylene)-1,3,5-trioxane, i.e., 1,1-dichloro-2,2,3,3-tetrafluoro-5,7,9-trioxaspiro[3.5]nonane as a clear, colorless liquid boiling at 73–74° C. under a pressure corresponding to 6 mm. of mercury. The infrared spectrum was consistent with the dichlorotetrafluorotrioxaspirononane structure.

*Analysis.*—Calcd. for $C_6H_4Cl_2F_4O_3$: C, 26.6%; H, 1.5%; F, 28.0%. Found: C, 27.0%; H, 1.4%; F, 27.9%.

The present invention is generic to polyfluoromono- and -dispiro-1,3,5-trioxanes in which the 2-carbon or the 2- and 4-carbons of the 1,3,5-trioxane ring are spiro carbons, wherein the second ring or the second and third rings of the molecular structure linked in spiro fashion through these carbons to the 1,3,5-trioxane nucleus are four-membered dihalotetrafluorocyclobutane rings and the 4- and 6-carbons or just the 6-carbon, depending, respectively, on whether there are one or two spiro tetrafluoroperhalocyclobutane structures, carry two hydrogens or from one to two monovalent radicals free of aliphatic unsaturation and Zerewitinoff active hydrogen and of no more than eight carbons each. The two halogen substituents possibly present in each cyclobutane ring, in addition to the required four fluorine substituents in said ring, can be fluorine, chlorine, or bromine, alike or different, preferably the first two and most especially both fluorine. Preferably the said monovalent radicals are wholly hydrocarbon.

The present invention is likewise generic to the preparation of the polyfluoromono- and dispiro 1,3,5-trioxanes by the direct cycloaddition between, respectively, one and two molar proportions of the requisite 2,2-dihalo-3,3,4,4-tetrafluorocyclobutanone and, respectively, from two to one molar proportions of the requisite carboxaldehyde or ketone. The substituents if any in the resulting mono- or dispirotrioxanes, i.e., those on the 4- and 6-carbons in the case of the monospiro compounds and on the 6-carbon in the case of the dispiro compounds, will be the monovalent substituents which together with, respectively, the formyl group and the carbonyl group from the carboxaldehyde or ketone reactants. Thus, the 2,2-dihalo-3,3,4,4-tetrafluorocyclobutanone reactans furnish from one to two of the ring oxygens of the 1,3,5-trioxane, depending on whether the products are the mono- or the dispiro products. Correspondingly, the carboxaldehyde or ketone reactant furnishes the remaining ring oxygens, i.e., the 4- and 6-oxygens in the case of the monospiro compounds and just the 6-oxygen in the case of the dispiro compounds. The dihalotetrafluorotrimethylene bridges forming the spirocyclobutane structures are those from the 2,2-dihola-3,3,4,4-tetrafluorocyclobutanones.

The reaction is a simple one and requires no complicated operating procedures or equipment. Generally the reaction is carried out in sealed reactors, of which the most convenient are glass or glass-lined reactors. Because of the relatively low boiling nature of some of the 2,2-dihalo-3,3,4,4-tetrafluorocyclobutanones and likewise because of the extreme chemical reactivity of these compounds, e.g., with, for instance, water and the more reactive of the oxocarbonyl coreactants here involved, the reaction will generally be carried out by cooling the evacuated reactor to liquid nitrogen temperatures or at least to those of solid carbon dioxide (about −80° C.), charging the particular 2,2-dihalo-3,3,4,4-tetrafluorocyclobutanone involved as well as the oxocarbonyl coreactant, sealing, and allowing the reactor to warm slowly to room temperature. Depending on the relative reactivity of the 2,2-dihalo-3,3,4,4-tetrafluorocyclobutanone and of the oxocarbonyl coreactant being used, the reaction vessel may or may not require heating. With the simpler alkyl oxocarbonyl coreactants, the reaction generally occurs spontaneously as the reactor warms to room temperature, and, in any event, with such coreactants the reaction can be brought to essential completeness with little if any required heating. In the case of the less reactive hydrocarbyl oxocarbonyl coreactants, for instance, with the aromatic and alkaromatic carboxaldehydes, cycloalkyl carboxaldehydes, and cycloalkyl ketones, the sealed reactor will require heating, for instance, to steam bath temperatures for a few hours time. To insure completeness of reaction with such coreactants and other oxocarbonyl coreactants of greater molecular weight, the reaction vessel might require heating to elevated temperatures, but in no case are temperatures much above about 250° C. nor reaction times much greater than about 24 hours required.

The reaction mixtures are worked up quite simply to obtain the desired polyfluorospirotrioxanes. Thus, at the completion of the reaction, it is only necessary to open the reactor to the atmosphere, distill away any unreacted dihalotetrafluorocyclobutanone and/or oxocarbonyl coreactant, and isolate and purify the desired products by distillation. The mono- and dispiropolyfluorotrioxanes being stable materials, both chemically and physically, can be distilled directly with no special equipment requirements. As the molecular weight of any substituents on the 4- or 4- and 6-carbons increases and/or as the atomic weight of the halogen on the 2-carbons of the cyclobutane rings increases, so, too, does the boiling point of the polyfluoromono- and dispirotrioxane products. As the substituents in the 6- or 4- and 6-positions reach their maximum carbon content of generally no greater than eight in each such radical, and as the α-halogen in the α,α-dihalo-β,β,γ,γ-tetrafluoromethylene groups forming the spirocyclobutane rings both increase above an atomic number of 17, i.e., are chlorine and/or bromine, the mono- and dispiropolyfluorotrioxanes tend to become solids at room temperature.

The reaction can be effected properly in the presence or absence of an inert organic reaction medium, which, if present, should be anhydrous. Any inert liquid organic diluent can be used and, generally speaking, the most common are the normally liquid hydrocarbons and polyfluorohydrocarbons, including aliphatic and aromatic compounds, such as the hexanes, heptanes, octanes, and the like; benzene, toluene, the xylenes, and the like; cycloaliphatic hydrocarbon solvents, such as cyclohexane and the like; the polyfluoroaliphatic hydrocarbons, e.g., 1,1,2,2-tetrafluoro-3,3-dimethylbutane and the like; the polyfluoroaliphatic/cycloaliphatic hydrocarbons, e.g., perfluorodimethylcyclohexane and the like. The choice of the particular diluent, if used, is not at all critical and will vary with such other normal variables as the reaction temperature found necessary to effect reaction. In most instances, in order to simplify the reaction, no diluent is used. The requisite 2,2-dihalo-3,3,4,4-tetrafluorocyclobutanone and oxocarbonyl coreactants are simply mixed as described previously and the product isolated therefrom by distillation. The absence of a diluent generally makes separation of unreacted material and desired product easier.

In the case of the monospiro compounds, it is possible to use mixtures of the oxocarbonyl coreactants to prepare monospiropolyfluoro-1,3,5-trioxanes wherein the substituents on the 4- and 6-carbons are different. For instance, equimolar proportions of the 2,2-dihalo-3,3,4,4-tetrafluorocyclobutanone, a carboxaldehyde, and a ketone can be charged. The resultant monospiropolyfluorotrioxane product will be a mixture wherein the substituents in the 4- and 6-positions are variously both the nonoxo radicals of the carboxaldehyde, wherein the substituent in the 4-position is that of the carboxaldehyde and those in the 6-position are those of the ketone, wherein those in the 4-position are those of the ketone and that in the 6-position is that of the carboxaldehyde, and finally wherein all four substituents on the 4- and 6-carbons are those of the ketone. Because of inherent difficulties in separating such mixtures, it is generally preferred to use the various carboxaldehyde and ketone reactants separately.

From the foregoing, it is apparent that in preparing these new polyfluoromono- and -dispiro-1,3,5-trioxanes there can be used any 2,2-dihalo-3,3,4,4-tetrafluorocyclobutanone wherein the two halogen substituents are of atomic number from 9 to 35 inclusive, i.e., fluorine, chlorine, and bromine. More specifically, there can be used perfluorocyclobutanone, 2-chloro-2,3,3,4,4-pentafluorocyclobutanone, 2-bromo-2,3,3,4,4-pentafluorocyclobutanone, 2-bromo-2-chloro-3,3,4,4,-tetrafluorocyclobutanone, 2,2-dichloro-3,3,4,4-tetrafluorocyclobutanone, and 2,2-dibromo-3,3,4,4-tetrafluorocyclobutanone.

Of these polyfluorocyclobutanones, the various chlorofluorocyclobutanones have been disclosed in U.S. Patents 2,712,554 and -5, although no detailed method for the preparation thereof is there disclosed. Perfluorocyclobutanone is a new compound per se and is being claimed in the copending application of England, Serial No. 757,701, filed August 28, 1958, a continuation-in-part of England application Serial No. 717,805, filed February 27, 1958, and now abandoned. All of these polyfluoroperhalocyclobutanones can be readily prepared by the cyclo-addition reaction between perfluorovinyl hydrocarbyl ethers with the requisite 1,1-dihalo-2,2-difluoroethylenes followed by hydrolysis of the resultant 1-hydrocarbyloxy-1,3, 3,4,4-pentafluoro-2,2-dihalocyclobutanes, all as disclosed and claimed in application Serial No. 43,331, another continuation-in-part of the above-mentioned copending application of England, Serial No. 717,805. These cyclobutanones are generically liquid to solid, depending on the total molecular weight which varies with the halogens, quite reactive materials which should preferably be handled under anhydrous conditions.

As the cycloaddition coreactant with the just-described 2,2-dihalo-3,3,4,4-tetrafluorocyclobutanones, there can be used any oxocarbonyl compound, inclusive of both carboxaldehydes and hydrocarbyl ketones. Generically the oxocarbonyl coreactants are inclusive of alkyl, aryl, aralkyl, alkaryl, and cycloalkyl carboxaldehydes and ketones free of Zerewitinoff active hydrogen and free of aliphatic unsaturation, i.e., aliphatically saturated, and especially those which other than the single oxocarbonyl moiety of the carboxaldehyde formyl group or of the ketone carbonyl group are solely hydrocarbon. Suitable specific illustrations within the genus of these coreactants include aliphatic carboxaldehydes, i.e., the so-called alkanals, such as formaldehyde, acetaldehyde, bromoacetaldehyde, hexanal, and the like; cycloaliphatic carboxaldehydes such as cyclohexanecarboxaldehyde and the like; aromatic carboxaldehydes such as p-chloro- and p-nitrobenzaldehydes, and the like; alkaromatic carboxaldehydes such as p-methylbenzaldehyde, i.e., tolualdehyde, and the like; aliphatic ketones such as acetone, 6-undecanone, i.e., di-n-pentyl ketone, and the like; araliphatic ketones such as methyl β-phenylethyl ketone, and the like.

While mixtures of the monospiro- and dispiro-1,3,5-trioxanes are probably obtained in all the reactions between the aforesaid described 2,2-dihalo-3,3,4,4-tetrafluorocyclobutanones and the various classes and types of aldehydes and ketones, one or the other type product will be greatly favored, depending on the nature of the specific aldehyde or ketone coreactant used with the dihalotetrafluorocyclobutanones. It is not known why this is so, but it is believed that the various equilibria are largely controlled as to the formation of either the mono- or dispiro products by virtue of steric effects since the nature of the product is not immediately altered by the stoichiometry. Thus, apparently irrespective of the specific nature of the halogen substituents on the 2-carbon of the tetrafluorocyclobutanone coreactant, in the case of the aliphatic and cycloaliphatic carboxaldehydes the only product formed in significantly isolatable quantities will be the monospiro product, i.e., the 1,3,5-trioxane obtained from two molar proportions of the aliphatic or cycloaliphatic carboxaldehyde and one molar proportion of the cyclobutanone. Similarly, in the case of the ketones, by far the major product obtained will be the dispirotrioxanes, i.e., a cyclic product involving two molar proportions of the fluorocyclobutanone and one molar proportion of the aliphatic ketone coreactant. In the case of the aromatic carboxaldehyde the situation is not as straightforward and both mono- and dispiro products will be obtained, varying with the specific nature of the particular aromatic carboxaldehyde involved. It is not believed, however, that mixtures will be obtained in significant quantities with any one aromatic carboxaldehyde, i.e., either a mono- or dispiro product will be obtained in the great majority depending on the specific aldehyde. Thus, as is illustrated in the foregoing detailed examples, the simplest aromatic carboxaldehyde, benzaldehyde, gives substantially only the dispiro product. Because of packing effects, the larger aromatic carboxaldehydes will form mostly only the monospirotrioxanes.

Using the cycloaddition reaction conditions outlined in the foregoing, there will be obtained from the specific polyfluoroperhalocyclobutanone and oxocarbonyl reactants just discussed additional specific examples of the mono- and dispiropolyfluoro-1,3,5-trioxanes of the present invention. More specifically, from acetaldehyde and 2-chloro-2,3,3,4,4-pentafluorocyclobutanone there will be obtained 1-chloro-1,2,2,3,3-pentafluoro-6,8-dimethyl-5,7, 9-trioxaspiro[3.5]nonane. From formaldehyde and 2-bromo-2,3,3,4,4-pentafluorocyclobutanone there will be obtained 1-bromo-1,2,2,3,3-pentafluoro-5,7,9-trioxaspiro [3.5]nonane. From tolualdehyde and perfluorocyclobutanone there will be obtained 1,1,2,2,3,3-hexafluoro-6,8-ditolyl-5,7,9-trioxaspiro[3.5]nonane. From hexanal and perfluorocyclobutanone there will be obtained 1,1,2,2,3,3-hexafluoro-6,8-di-n-pentyl-5,7,9-trioaxaspiro[3.5] nonane. From cyclohexanecarboxaldehyde and perfluorocyclobutanone there will be obtained 1,1,2,2,3,3-hexafluoro-6,8-dicyclohexyl-5,7,9-trioxaspiro[3.5]nonane. From acetone and 2-chloro-2,3,3,4,4-pentafluorocyclobutanone there will be obtained 6,6-dimethyl-2,2,4, 4-bis(α-chloro-α,β,β,γ,γ-pentafluorotrimethylene)-1,3,5-trioxane. From 6-undecanone and perfluorocyclobutanone there will be obtained 6,6-di-n-pentyl-2,2,4,4-bis(α,γ-hexafluorotrimethylene)-1,3,5-trioxane. From p-chlorobenzaldehyde and perfluorocyclobutanone there will be obtained 6-p-chlorophenyl-2,2,4,4-bis(α,γ-hexafluorotrimethylene)-1,3,5-trioxane. From p-nitrobenzaldehyde and perfluorocyclobutanone there will be obtained 6-p-nitrophenyl-2,2,4,4-bis(α,γ-hexafluorotrimethylene)-1,3,5-trioxane. From methyl β-phenylethyl ketone, i.e., 4-phenyl-2-butanone, and perfluorocyclobutanone there will be obtained 6-(β-phenylethyl)-6-methyl-2,2,4, 4-bis(α,γ-hexafluorotrimethylene)-1,3,5-trioxane. From bromoacetaldehyde and perfluorocyclobutanone there will be obtained 1,1,2,2,3,3-hexafluoro-6,8-bis(bromomethyl)-5,7,9-trioxaspiro[3.5]nonane. From acetone and 2,2-dichloro-3,3,4,4-tetrafluorocyclobutanone there will be obtained 6,6-dimethyl-2,2,4,4-bis(α,α-dichloro-β,β,γ,γ-tetrafluorotrimethylene)-1,3,5-trioxane.

The polyfluoroperhalocyclobutane mono- and dispirotrioxanes of the present invention are generically useful as waterproofing agents, particularly for polyvinyl alcohol, e.g., in shaped object form. This relatively available commercial polymer, while outstanding for many uses, suffers markedly from its severe moisture sensitivity and water solubility. In fact, most of the commercial uses of this polymer depend on these properties. Obviously, it would be desirable to be able to modify or control the water sensitivity of the polymer so as to broaden the field of uses thereof to be inclusive of such widespread commercial outlets as transparent wrapping film for perishables, e.g., produce and the like, where moisture sensitivity, water vapor transpirability and, of course, water solubility must each be at a minimum. The new polyfluorocyclobutane mono- and dispirotrioxanes of the present invention solve these fundamental deficiencies in polyvinyl alcohol quite simply and effectively. Thus, it is only necessary that the shaped polyvinyl alcohol object be exposed to the vapors and/or the liquid form of these new polyfluorocyclobutane mono- and dispirotrioxanes.

More specifically, a sample (0.5 x 3.0 cm.) of a 3-mil film prepared from a commercially available polyvinyl alcohol by conventional casting procedures was placed in a cylindrical glass reactor and about 0.2 g. of 1,1,2,2,3,3-hexafluoro-5,7,9-trioxaspiro[3.5]nonane of Example IV was added. The reactor was heated so that the tiroxaspirononane refluxed for approximately one minute and accordingly thoroughly covered the film strip with the vapors of the trioxaspironane. The film was removed from the reactor and any residual trioxaspironane blown off with a stream of air. The treated film was placed in a glass reactor and covered with water. The reactor was then heated in boiling water for 15 minutes and then allowed to stand overnight with the film still covered with water. At the end of this time, the polyvinyl alcohol film appeared substantially unchanged, retaining boh its strength and shape and apparently exhibiting good dimensional stability and fidelity. In contrast, a control, i.e., untreated film, of polyvinyl alcohol from the same batch of commercial polymer when placed in liquid water partly dissolved almost immediately and did dissolve in a few minutes in contact with liquid water even at room temperature. Substantially the same results were obtained using additional samples of the polyvinyl alcohol film with the 6,6-dimethyl-2,2,4,4-bis(α,γ-hexafluorotrimethylene)-1,3,5-trioxane of Example III and the 1,1,2,2,3,3-hexafluoro - 6,8 - dimethyl-5,7,9-trioxaspiro[3.5]nonane of Example V.

In addition to the above-described waterproofing characteristics, the polyfluoroperhalocyclobutane mono- and dispirotrioxanes of the present invention exhibit good solvent action on polymers containing lateral ester groups, including both the ester addition polymers, such as polyvinyl acetate, and the ester-modified natural polymers, such as cellulose acetate. Thus, these polyfluoroperhalocyclobutane mono- and dispirotrioxanes are useful in low concentrations as plasticizers for such polymers in all shaped object forms and more particularly are useful as solvents for such polymers in the preparation of shaped objects therefrom, e.g., in the casting of films or the spinning of fibers. More specifically, a strip of commercially available cellulose acetate film was dissolved in the 1,1,2,2,3,3,-hexafluoro-5,7,9-trioxaspiro[3.5]nonane of Example IV. The resultant solution was cast onto a glass plate. The glass was warmed on an electric hot plate to remove the trioxaspironane solvents. There was thus obtained a film of the cellulose acetate which, on removal from the glass plate, was self-supporting and appeared essentially unchanged from the starting film.

Since obvious modifications in the invention will occur to those skilled in the chemical art, I propose to be bound solely by the appended claims.

The embodiments of the invention in which an exclusive property or privilege is claimed are defined as follows:

1. A compound of the formula

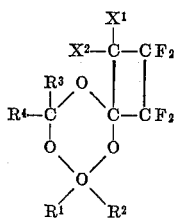

wherein: $X^1$ and $X^2$ are selected from the group consisting of fluorine, chlorine and bromine; $R^1$ is selected from the group consisting of hydrogen and monovalent hydrocarbon radicals of up to 8 carbons and free of aliphatic unsaturation and of Zerewitinoff active hydrogen, wholly aliphatic radicals containing no more than 5 carbons; $R^2$ is selected from the group consisting of hydrogen and alkyl of up to 5 carbons, $R^2$ being hydrogen when $R^1$ is connected to trioxane ring carbon through aromatic carbon; $R^3$ is selected from the group consisting of hydrogen and monovalent hydrocarbon radicals of up to 8 carbons free of aliphatic unsaturation and of Zerewitinoff active hydrogen, wholly aliphatic radicals containing no more than 5 carbons; and $R^4$ is selected from the group consisting of hydrogen and alkyl of up to 5 carbons, $R^4$ being hydrogen when $R^3$ is connected to trioxane ring carbon through aromatic carbon.

2. A compound of the formula

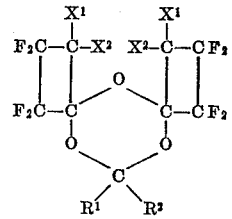

wherein: $X^1$ and $X^2$ are selected from the group consisting of fluorine, chlorine and bromine; $R^1$ is selected from the group consisting of monovalent hydrocarbon radicals of up to 8 carbons free of aliphatic unsaturation and of Zerewitinoff active hydrogen, wholly aliphatic radicals containing no more than 5 carbons; and $R^2$ is selected from the group consisting of hydrogen and alkyl of up to 5 carbons, $R^2$ being hydrogen when $R^1$ is connected to trioxane ring carbon through aromatic carbon.

3. 1,1,2,2,3,3 - hexafluoro-6,8-di-n-propyl-5,7,9-trioxaspiro[3.5]nonane, B.P. about 73° C. at 10 mm. of mercury pressure.

4. 2,2,3,3,4,4-hexafluorocyclobutane-spiro-2'-4'-phenyl-1',3',5'-trioxane - 6'-spiro-1''-2'',2'',3'',3'',4'',4''-hexafluorocyclobutane, B.P. about 69° C. at 2 mm. of mercury pressure, $n_D^{25}$=1.3960.

5. 2,2,3,3,4,4 - hexafluorocyclobutane-1-spiro-2'-4',4'-dimethyl-1',3',5' - trioxane-6'-spiro-1'',2'',2'',3'',3'',4'',4''-hexafluorocyclobutane, B.P. about 30° C. at 4 mm. of mercury pressure, $n_D^{25}$=1.3402.

6. 1,1,2,2,3,3-hexafluoro-5,7,9-trioxaspiro[3.5]-nonane, B.P. about 76° C. at 100 mm. of mercury pressure.

7. 1,1,2,2,3,3-hexafluoro-6,8-dimethyl-5,7,9-trioxaspiro[3.5]nonane, B.P. about 135° C. at atmospheric pressure.

8. 1,1-dichloro-2,2,3,3-tetrafluoro-5,7,9-trioxaspiro[3.5]nonane, B.P. 73–74° C. at 6 mm. of mercury pressure.

9. The process of preparing a member of the group consisting of polyfluoromono- and -dispiro-1,3,5,-trioxanes which comprises reacting together a 2,2-dihalo-3,3,4,4-tetrafluorocyclobutanone and a member of the group consisting of carboxaldehydes and ketones free of aliphatic unsaturation and of Zerewitinoff active hydrogen.

10. The process of claim 9 in which the 2,2-dihalo-3,3,4,4-tetrafluorocyclobutanone is perfluorocyclobutanone.

11. The process of preparing the compound of claim 3 which comprises reacting together perfluorocyclobutanone and n-butyraldehyde.

12. The process of preparing the compound of claim 4 which comprises reacting together perfluorocyclobutanone and benzaldehyde.

13. The process of preparing the compound of claim 5 which comprises reacting together perfluorocyclobutanone and acetone.

14. The process of preparing the compound of claim 6 which comprises reacting together perfluorocyclobutanone and a form of formaldehyde.

15. The process of preparing the compound of claim 7 which comprises reacting together perfluorocyclobutanone and acetaldehyde.

16. The process of claim 9 in which the 2,2-dihalo-3,3,4,4-tetrafluorocyclobutanone is 2,2-dichloro-3,3,4,4-tetrafluorocyclobutanone.

17. The process of preparing the compound of claim 8 which comprises reacting together 2,2-dichloro-3,3,4,4-tetrafluorocyclobutanone and a form of formaldehyde.

No references cited.

UNITED STATES PATENT OFFICE
CERTIFICATE OF CORRECTION

Patent No. 2,996,518

August 15, 1961

David C. England

It is hereby certified that error appears in the above numbered patent requiring correction and that the said Letters Patent should read as corrected below.

Column 9, line 58 to 62, the lower part of the formula should read as shown below instead of as in the patent:

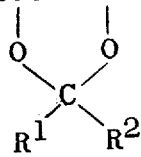

Signed and sealed this 6th day of March 1962.

(SEAL)
Attest:

ERNEST W. SWIDER
Attesting Officer

DAVID L. LADD
Commissioner of Patents